United States Patent
Filippi et al.

(10) Patent No.: US 8,007,734 B2
(45) Date of Patent: Aug. 30, 2011

(54) ISOTHERMAL REACTOR

(75) Inventors: Ermanno Filippi, Castagnola (CH);
Enrico Rizzi, Casnate con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 78 days.

(21) Appl. No.: 12/440,204

(22) PCT Filed: Aug. 20, 2007

(86) PCT No.: PCT/EP2007/007336
§ 371 (c)(1),
(2), (4) Date: Jan. 28, 2010

(87) PCT Pub. No.: WO2008/031488
PCT Pub. Date: Mar. 20, 2008

(65) Prior Publication Data
US 2010/0135871 A1    Jun. 3, 2010

(30) Foreign Application Priority Data
Sep. 11, 2006  (EP) .................................. 06018961

(51) Int. Cl.
*F28D 7/00*    (2006.01)
*B01J 8/02*    (2006.01)

(52) U.S. Cl. ........ 422/201; 422/198; 422/200; 422/211; 422/218; 165/158; 165/159; 165/160

(58) Field of Classification Search .................. 422/198, 422/200, 201, 211, 218; 165/158, 159, 160
See application file for complete search history.

(56) References Cited

U.S. PATENT DOCUMENTS

| | | | |
|---|---|---|---|
| 6,264,856 B1 | 7/2001 | Autenrieth et al. | |
| 6,365,114 B1 * | 4/2002 | Marold | 422/200 |
| 6,467,758 B1 * | 10/2002 | Filippi | 261/128 |
| 7,727,493 B2 * | 6/2010 | Filippi et al. | 422/200 |
| 2004/0266893 A1 * | 12/2004 | Filippi et al. | 518/726 |
| 2005/0061490 A1 * | 3/2005 | Filippi et al. | 165/145 |

FOREIGN PATENT DOCUMENTS

| | | |
|---|---|---|
| AT | 362397 B | 5/1981 |
| EP | 1221339 A1 | 7/2002 |
| EP | 1306126 A1 | 5/2003 |
| WO | 2005/063375 A1 | 7/2005 |

OTHER PUBLICATIONS

Machine translation for AT362397A—May 23, 2011.*

* cited by examiner

*Primary Examiner* — Walter Griffin
*Assistant Examiner* — Huy-Tram Nguyen
(74) *Attorney, Agent, or Firm* — Akerman Senterfitt

(57) ABSTRACT

The present invention concerns an isothermal reactor (1) for carrying out exothermal or endothermal heterogeneous reactions comprising: —a substantially cylindrical outer shell (2) with longitudinal axis (X), —at least one catalytic bed (6) extending in the shell (2) and comprising opposite perforated side walls (7, 8) respectively for the inlet of a gaseous flow of reactants and for the outlet of a gaseous flow comprising reaction products, and —a heat exchange unit (12) immersed in said at least one catalytic bed (6) and crossed by a heat exchange fluid, characterized in that said heat exchange unit (12) comprises at least one succession of heat exchangers (13) arranged substantially parallel to each other and substantially parallel to the direction in which said at least one catalytic bed (6) is crossed by said gaseous flow of reactants.

4 Claims, 3 Drawing Sheets

ISOTHERMAL REACTOR

FIELD OF APPLICATION

In its most general aspect, the present invention concerns an isothermal reactor for carrying out exothermal or endothermal heterogeneous reactions, comprising:
- a substantially cylindrical outer shell with longitudinal axis,
- at least one catalytic bed extending in the shell and comprising opposite perforated side walls respectively for the inlet of a gaseous flow of reactants and for the outlet of a gaseous flow comprising reaction products
- a heat exchange unit immersed in said catalytic bed and crossed by a heat exchange fluid.

Such a reactor is particularly useful for carrying out exothermal or endothermal reactions performed in substantially isothermal conditions, in other words conditions in which the reaction temperature is controlled in a narrow range of values around a predetermined value.

In the remainder of the description and in the subsequent claims, a reactor of the aforementioned type is identified with the terms: pseudo-isothermal reactor or in short isothermal reactor.

As known, in the field of carrying out exothermal or endothermal heterogeneous synthesis, there is an increasing need to make isothermal reactors with high capacity that on the one hand are simple to make, reliable and require low investment and maintenance costs, and on the other hand allow operation with low load losses, low energy consumption and with high heat exchange efficiency between the reactants and the heat exchange fluid.

PRIOR ART

In order to satisfy the aforementioned requirement, isothermal reactors with a radial catalytic bed have been proposed in the field, comprising, as heat exchange unit for feeding or removing heat, a plurality of heat exchangers of plate-shaped or tubular structure arranged radial, with reference to the axis of the shell of the reactor, in one or more coaxial rows.

Although advantageous from some points of view, the aforementioned isothermal reactors with radial configuration have a series of drawbacks including that they have a non-homogeneous catalytic area between the heat exchangers due to their radial arrangement.

As a result, the heat exchange is not always optimal between the gaseous flow that crosses the catalytic bed and the heat exchange fluid in the heat exchangers, in particular in the area of the catalytic bed in which the distance between adjacent exchangers is greater, as well as a non-uniform crossing speed of the catalytic bed by said gaseous flow, since the latter is subjected to variations in speed according to the lesser or respectively greater section for crossing the catalytic bed.

Moreover, in known isothermal reactors, the radial configuration of the heat exchangers is complicated in terms of construction and assembly.

SUMMARY OF THE INVENTION

The technical problem forming the basis of the present invention is therefore that of providing an isothermal reactor for carrying out exothermal or endothermal heterogeneous reactions that overcomes the aforementioned drawbacks with reference to known isothermal reactors having radial configuration.

Such a problem is solved by an isothermal reactor for carrying out exothermal or endothermal heterogeneous reactions comprising:
- a substantially cylindrical outer shell with longitudinal axis,
- at least one catalytic bed extending in the shell and comprising opposite perforated side walls respectively for the inlet of a gaseous flow of reactants and for the outlet of a gaseous flow comprising reaction products, and
- a heat exchange unit immersed in said at least one catalytic bed and crossed by a heat exchange fluid, characterised in that said heat exchange unit comprises at least one succession of heat exchangers arranged substantially parallel to each other and substantially parallel to the direction in which said at least one catalytic bed is crossed by said gaseous flow of reactants.

Preferably, each exchanger of said at least one succession of heat exchangers extends in said at least one catalytic bed along a direction substantially parallel to the axis of said shell.

According to an aspect of the present invention, said heat exchangers have a substantially box-shaped structure, with essentially elongated and flattened rectangular configuration with opposite long sides parallel to the axis of the shell and opposite short sides arranged perpendicular to said axis, said exchangers also comprising an inner chamber intended to be crossed by said operative heat exchange fluid.

According to another aspect the present invention, said heat exchangers each have a substantially tubular structure with each tube extending in a direction substantially perpendicular to the axis of the shell.

Thanks to the present invention, it is advantageously possible to simply and effectively make an isothermal reactor with a high heat exchange coefficient, to the great advantage of the conversion yield and energy consumption.

Indeed, unlike the radial configuration of isothermal reactors of the prior art, in the present invention the heat exchangers are arranged substantially parallel to each other and this means that it is possible to obtain homogeneous catalytic areas (i.e. substantially constant sections) between adjacent exchangers to be crossed by the gaseous flow comprising reactants and reaction products in a direction perpendicular to the axis of the shell and in portions substantially parallel to each other.

This involves that each portion of gaseous flow comprising reactants and reaction products is able to exchange heat efficiently with the relevant heat exchangers along the entire respective catalytic section for crossing of the catalytic bed, thus obtaining an optimal temperature distribution inside the catalytic bed even for highly exothermal or endothermal reactions, to the great advantage of the conversion yield inside it and the relative energy consumption.

It should be observed that the parallel instead of radial arrangement of the heat exchangers advantageously allows the portions of the aforementioned gaseous flow to cross the catalytic bed with a practically uniform speed.

Moreover, the sections for the crossing of the catalytic bed by said gaseous flow comprising reactants and reaction products can be made smaller than those of an analogous radial configuration. As a result, therefore, said gaseous flow crosses the catalytic bed at a greater speed and there is less load loss, which allows the number and/or size of the catalytic beds to be reduced, to the great advantage of the greater simplicity of construction and assembly of the isothermal reactors of the invention compared to known radial isothermal reactors as well as lower maintenance costs.

Thus, for example, to produce ammonia, it is possible, thanks to the present invention, to use just one catalytic bed without having problems of the reactant gases crossing the catalytic bed at a too low speed, whereas, in known isothermal reactors with radial configuration it is necessary to have many overlapped catalytic beds to avoid the reactant gas g the catalytic beds at too low speed with a consequent low heat exchange coefficient between the reactant gases and the heat exchangers. Therefore, an isothermal reactor for producing ammonia according to the invention has a substantial simplification of its structure with respect to an analogous isothermal reactor of the prior art since it is possible to considerably reduce the number of connections (for example collector ducts, distributor ducts, etc.) necessary to place the various catalytic beds in communication as well as to distribute the heat exchange fluid in the various heat exchangers immersed in said catalytic beds.

Further characteristics and advantages of the present invention shall become clearer from the following description of some embodiments of the reactor according to the invention, given for indicating and not limiting purposes with reference to the attached drawings.

DETAILED DESCRIPTION

Figure 1:
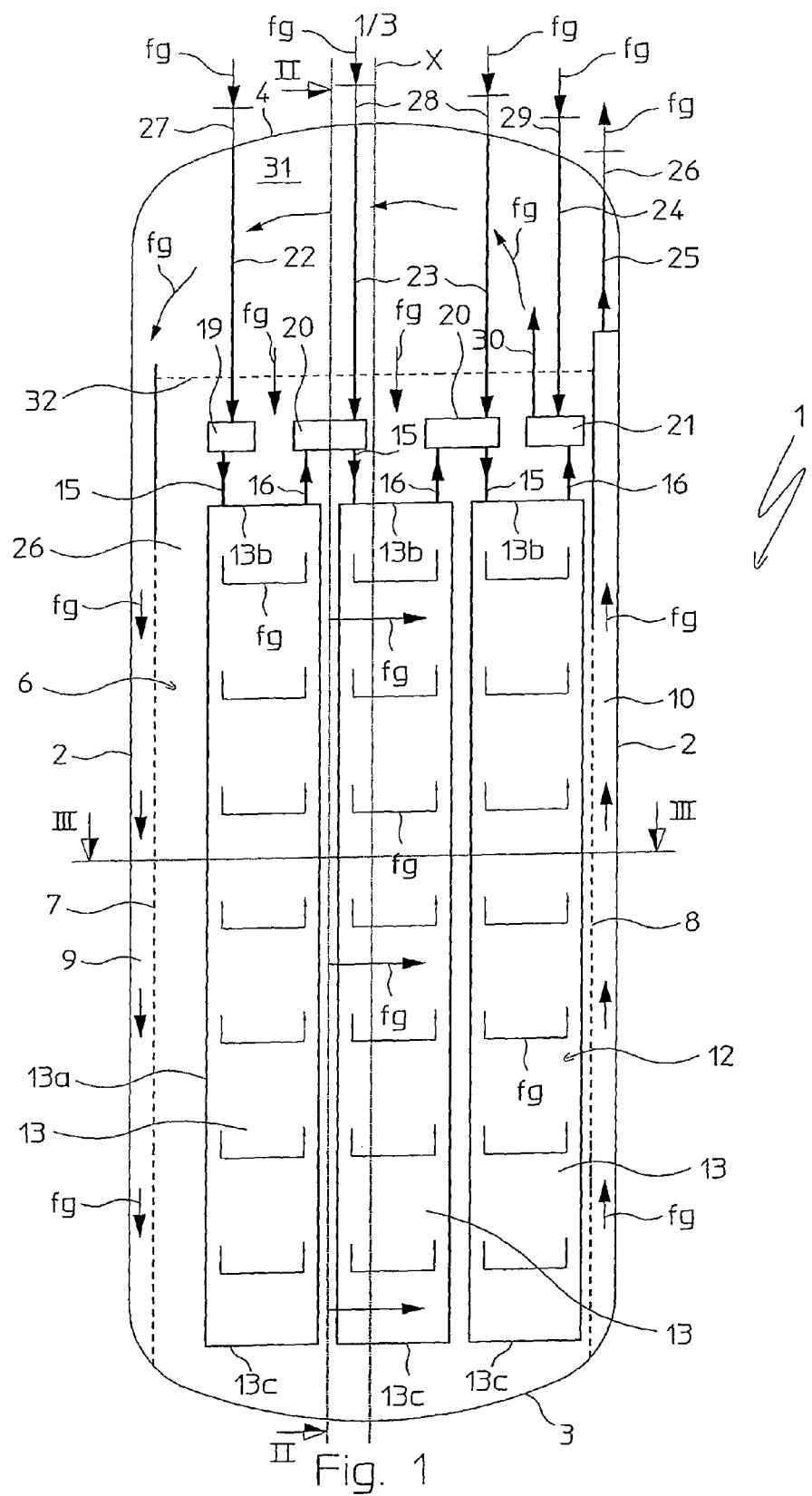
FIG. 1 shows a schematic longitudinal section view of an isothermal reactor for carrying out exothermal or endothermal heterogeneous reactions according to an embodiment of the present invention.

With reference to the aforementioned figures, reference numeral 1 globally indicates a pseudo-isothermal chemical reactor according to the present invention for the synthesis of chemical substances, in particular ammonia.

Said reactor 1 comprises a cylindrical shell 2, with longitudinal axis X, defined at the opposite ends by lower and upper bottoms 3, 4. In the example of the figures, the longitudinal axis X is vertical.

Inside the cylindrical shell 2 a catalytic bed, generically indicated with 6, is housed and supported in a per se conventional way, the catalytic bed 6 being delimited laterally by opposite perforated side walls 7 and 8 for the inlet of a gaseous flow of reactants and for the outlet of a gaseous flow comprising reactants and reaction products. The catalytic bed 6 is also open on top, i.e. equipped with grids for containing the catalyst that are permeable to gas, not represented as they are conventional. The filling level of the catalytic bed 6 by the catalyst (not represented) is generically indicated with 32.

A first interspace 9 between the outer shell 2 and the perforated side wall 7 for the distribution of the reactants inside the catalytic bed 6 and a second interspace 10 between the cylindrical shell 2 and the perforated side wall 8 acting as a collector for the reactant/reaction product mixture coming out from the catalytic bed 6 are also foreseen in the reactor 1. The second interspace 10 is also in fluid communication with an outlet duct 25 and a suitable passage (mouth 26) foreseen on the upper base plate 4 for the outlet of said reactant/reaction product mixture from the reactor 1.

In accordance with the present embodiment of the invention, inside the catalytic bed 6 a heat exchange unit is foreseen, generically indicated with 12, comprising a plurality of heat exchangers 13 distributed over three consecutive successions, with the exchangers of each succession being substantially parallel to each other and arranged substantially parallel to the direction in which said catalytic bed 6 is crossed by said gaseous flow of reactants.

More specifically, according to the present embodiment of the invention, the heat exchangers 13 have a substantially box-shaped structure, with essentially elongated and flattened rectangular configuration (plate-shaped) with opposite long sides 13a parallel to the axis X of the shell and opposite short sides 13b and 13c, respectively upper and lower, arranged perpendicular to said axis X.

Obviously, even if not shown, the heat exchangers 13 can have a tubular structure instead of a plate-shaped structure as described above to satisfy contingent and specific requirements.

In this case, each tube constituting a heat exchanger 13 preferably extends in a direction substantially perpendicular to the axis X of the shell 2.

Moreover, the number of successions of heat exchangers 13 can be varied as desired again according to contingent and specific requirements.

Going back to the heat exchangers 13 with plate-shaped structure described above, it should be said that each of them comprises an inner chamber intended to be crossed by an operative heat exchange fluid, as well as an inlet fitting 15 and an outlet fitting 16 of said operative heat exchange fluid, said fittings being positioned, in the example of the figures, on the same short side (upper short side 13b) as said exchangers 13.

The heat exchangers 13 of the succession closest to the perforated wall 7 for inlet into the catalytic bed 6 are in fluid communication, through said inlet fittings 15, with a distribution duct 19 of the heat exchange fluid, and through said outlet ducts 16, with a collector-distributor duct 20 of the heat exchange fluid. The heat exchangers 13 of the succession closest to the perforated wall 8 for outlet from the catalytic bed 6 are in fluid communication, through said inlet fittings 15, with a collector-distributor duct 20 of the heat exchange fluid, and through said outlet ducts 16, with a collector duct 21 of the heat exchange fluid, The heat exchangers 13 of the intermediate succession are in turn in fluid communication, through said inlet and outlet fittings 15 and 16, respectively, with said collector-distributor ducts 20.

More specifically, each collector-distributor duct 20, through respective fittings 16, collects the heat exchange fluid from the heat exchangers 13 of a succession to then inject it, through respective fittings 15, into the heat exchangers 13 of a consecutive succession.

The distribution duct 19, the collector-distributor ducts 20 and the collector duct 21 are in turn each in fluid communication with respective ducts 22, 23 and 24 for feeding into them a flow of reactant gases introduced inside the reactor 1 by suitable passages (mouths 27, 28 and 29 respectively) foreseen on the upper bottom 4. Moreover, the collector duct 21 is in fluid communication with the catalytic bed 6 through an outlet duct 30.

In the present embodiment such flows of reactant gases have the function of operative heat exchange fluid inside the heat exchangers 13.

According to alternative embodiments of the present invention, not represented, the fittings 15, 16 and the respective ducts 19, 20 and 21 can be arranged alternately at the various sides of the heat exchangers 13, so as to have them crossed by the operative heat exchange fluid in countercurrent with respect to the flow of reactant gases inside the catalytic bed 6, or else for some heat exchangers 13 in equicurrent (as shown in the figures) and in others in countercurrent. Moreover, it is possible to foresee many independent feeds of operative heat exchange fluid to the heat exchangers 13, which are thus fed in parallel to each other.

It should also be observed that, in the present embodiment, it is possible to distinguish an area 26 without heat exchangers 13 in the catalytic bed 6, said area 26 being close to the perforated wall 7 for the inlet of the reactant gases. The presence of an adiabatic area 26 without heat exchange close to the perforated wall 7, in which the reaction between the reactant gases is substantially triggered as soon as they have entered into the catalytic bed 6, may be important in some situations, for example where the heat exchange between the reactant gases that start to react in the catalytic bed and the heat exchange fluid in the exchangers could compromise the good progression of the reaction that has just begun.

Figure 2:
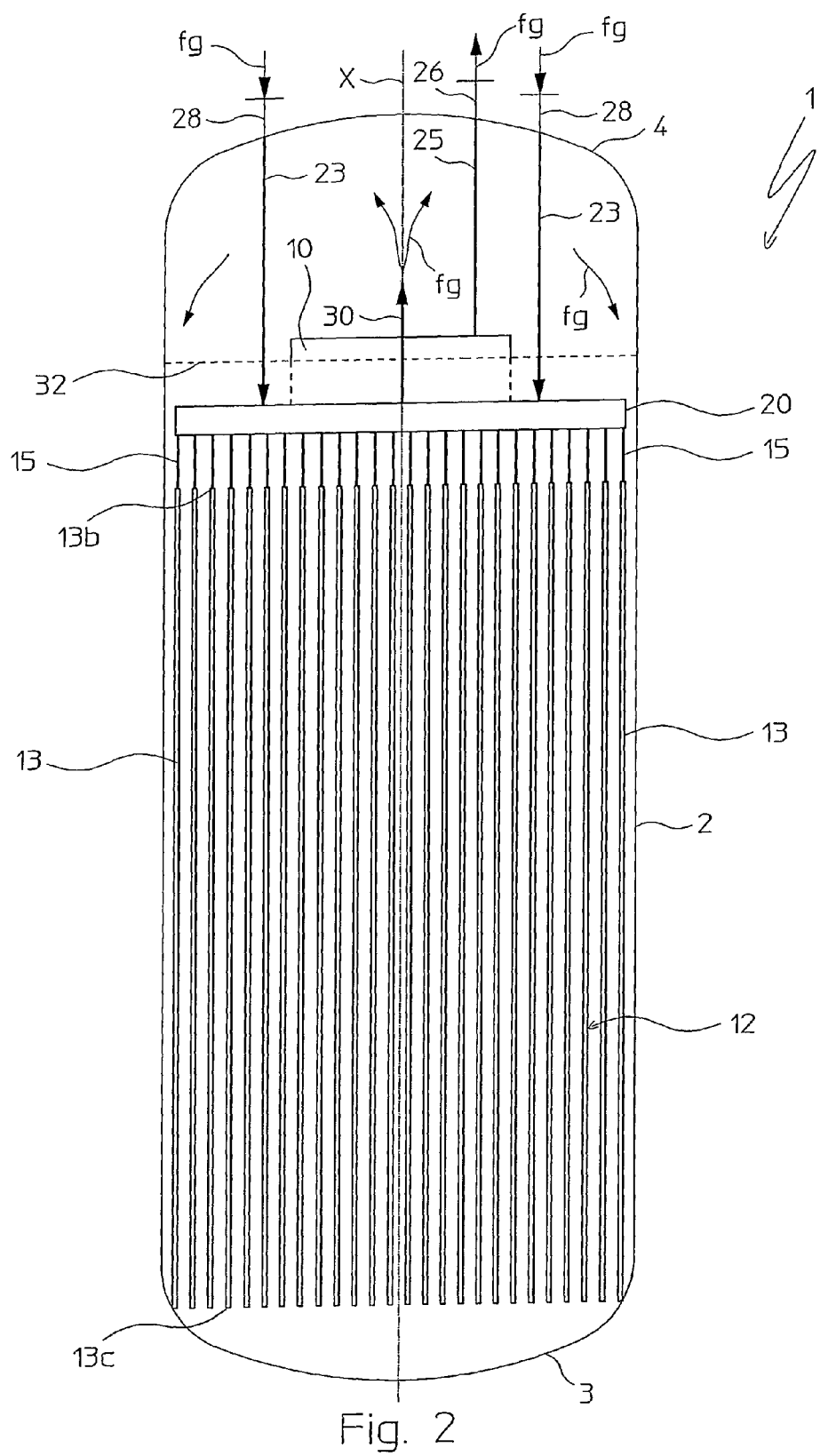
FIG. 2 shows a schematic longitudinal section view of the isothermal reactor of FIG. 1 according to the lines II-II.
Figure 3:
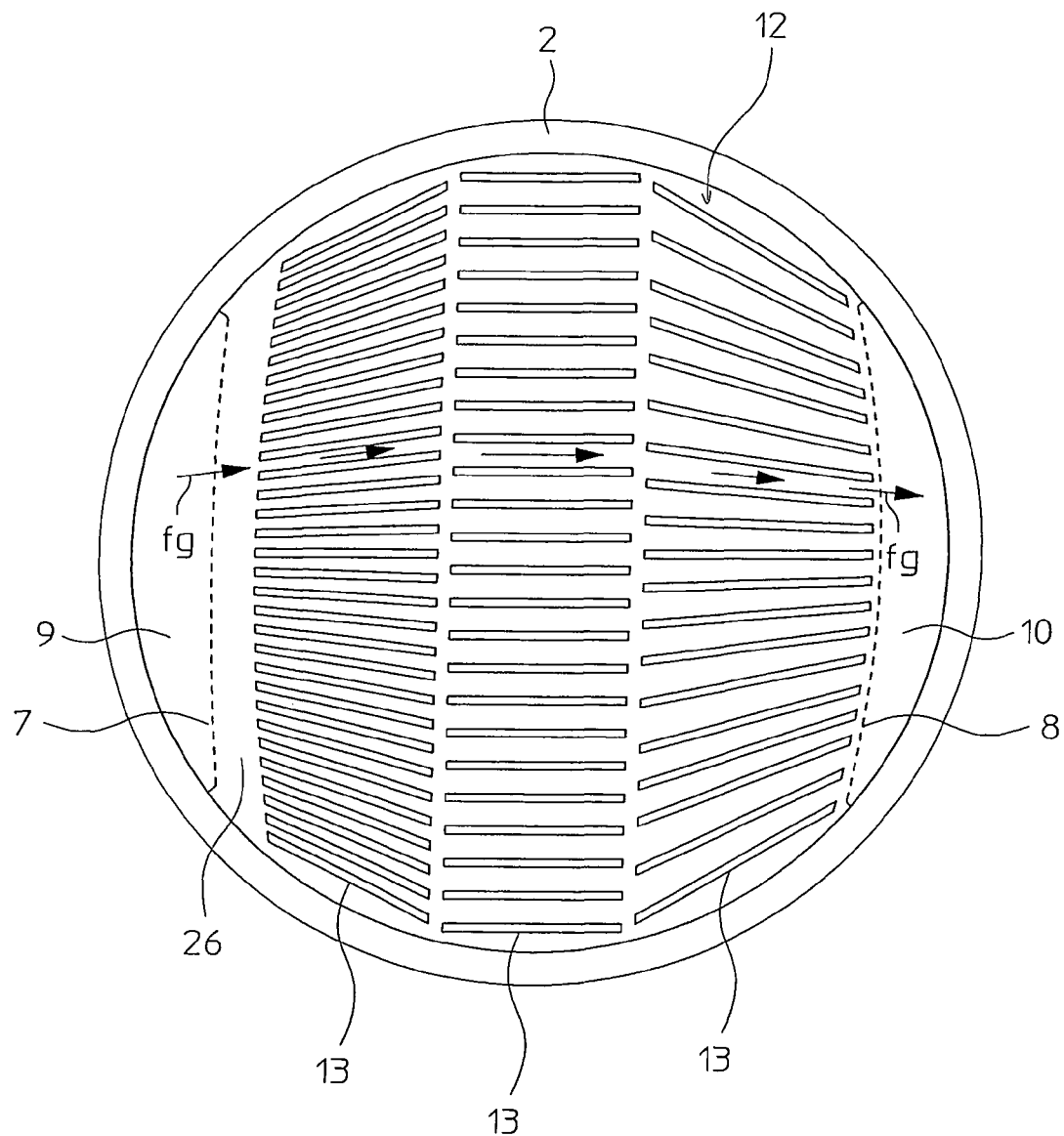
FIG. 3 shows a schematic transversal view of the isothermal reactor of FIG. 1 according to the lines III-III.

The flows of the gaseous flows flowing inside the reactor 1 are generically indicated in FIGS. 1-3 by the arrows fg.

As far as the operation of the isothermal reactor 1 is concerned, a flow of reactant gases is fed continuously to the reactor 1 through the mouth 27 on the upper bottom 4 and from here it is fed to the exchangers 13 of the succession closest to the perforated inlet wall 7 of the catalytic bed 6 through the feed duct 22, the distributor duct 19 and the fittings 15 of said heat exchangers 13.

Said flow of reactant gases thus continues on its path crossing said heat exchangers 13 of the succession closest to the perforated inlet wall 7 of the catalytic bed 6, where it operates as heat exchange fluid for a flow of reactant gases entering into the catalytic bed 6, to then be collected, through the fittings 16 of said exchangers 13, in a collector-distributor duct 20.

In the aforementioned collector-distributor duct 20, the flow of reactant gases collected by the heat exchangers 13 of the succession closest to the perforated inlet wall 7 is mixed with a new "fresh" flow of reactant gases coming from a feed duct 23, said "fresh" flow of reactants being continually introduced into the reactor 1 through the mouth 28 on the upper bottom 4.

The resulting mixture of reactant gases is then fed to the heat exchangers 13 of the consecutive succession (intermediate succession), for the heat exchange function, through the respective fittings 15 and from here, in the same manner indicated above, up to the last succession of heat exchangers 13, in other words the one closest to the perforated outlet wall 8 of the catalytic bed 6.

As can be seen in the example of FIG. 1, in each passage from a succession of heat exchangers 13 to the next succession, the flow of reactant gases coming out from a succession of heat exchangers 13 is preferably mixed (cooled in the case of an exothermal reaction or heated in the case of an endothermal reaction) in the respective collector-distributor duct 20 with a "fresh" flow of reactant gases fed to said duct 20 through a feed duct 23.

The flow of reactant gases coming out from the last succession of exchangers 13 through the respective fittings 16 is collected in a collector duct 21 where it is preferably mixed with a further "fresh" flow of reactant gases coming from the feed duct 24, said further "fresh" flow of reactants being introduced into the reactor 1 through the mouth 29 foreseen on the upper bottom 4.

The mixture thus obtained comes out from the collector duct 21 by means of an outlet duct 30 (arrows fg) and is injected into a space 31 inside the reactor 1 lying over the catalytic bed 6 and from here diffuses (for a minority portion) directly into the catalytic bed 6 or else descends (for a majority portion) along the interspace 9 and, passing through the perforated wall 7, diffuses into the catalytic bed 6. Regarding this, according to the example of the figures, the catalytic bed 6 is open on top and the perforated side walls 7 and 8 have an upper portion impermeable to gas so as to have the reactant gases cross the catalytic bed 6 with substantially axial-radial motion.

In accordance with the present invention, thanks to the substantially parallel arrangement of the heat exchangers 13 of the respective successions, the gaseous flow of reactant gases crosses the catalytic bed 6 in a direction perpendicular to the longitudinal axis X of the shell 2 and in portions substantially parallel to each other. Regarding this, see the path of the gaseous flow of reactant gases inside the catalytic bed 6 indicated in FIGS. 1 and 3.

More specifically, each parallel portion of the gaseous flow of reactant gases, after having crossed the triggering area 26 of the reaction in substantially adiabatic conditions, follows its path in the catalytic bed 6 along a homogeneous catalytic area or section between adjacent exchangers of the respective successions, thus obtaining a high heat exchange efficiency with the heat exchange fluid (flow of reactant gases) inside the heat exchangers 13 without excessive load losses, to the great advantage of a better conversion yield of said reactants in the reaction products and of a reduction in the relative energy consumption.

Therefore, a gaseous mixture comprising reactants and reaction products is obtained that, coming out from the catalytic bed 6 through the perforated wall 8, is collected in the interspace 10 having the function of a collector and from here transported outside of the reactor 1 through the outlet duct 25 and the relative mouth 26 on the upper bottom 4.

The invention thus conceived can undergo further modifications and variants, all of which are within the reach of the man skilled in the art and, as such, are covered by the scope of protection of the invention itself, as defined by the following claims.

The invention claimed is:

1. Isothermal reactor for carrying out exothermal or endothermal heterogeneous reactions comprising:
    a substantially cylindrical outer shell with longitudinal axis,
    at least one catalytic bed extending in the shell and comprising opposite perforated side walls respectively for the inlet of a gaseous flow of reactants and for the outlet of a gaseous flow comprising reaction products, and
    a heat exchange unit immersed in said at least one catalytic bed and crossed by a heat exchange fluid,
    wherein said at least one catalytic bed is delimited laterally by said opposite perforated side walls, wherein a first and a second interspace is defined between said shell and said perforated side walls, and in that said heat exchange unit comprises at least one succession of heat exchangers arranged substantially parallel to each other and substantially parallel to the direction in which said at least one catalytic bed is crossed by said gaseous flow of reactants.

2. The isothermal reactor according to claim 1, wherein each exchanger of said at least one succession of heat exchangers extends in said at least one catalytic bed along a direction substantially parallel to the axis of said shell.

3. The isothermal reactor according to claim 1, wherein said heat exchangers have a substantially box-shaped structure, with essentially elongated and flattened rectangular configuration with opposite long sides parallel to the axis of the shell and opposite short sides arranged perpendicular to said axis, said exchangers also comprising an inner chamber intended to be crossed by said operative heat exchange fluid.

4. The isothermal reactor according to claim 1, wherein said heat exchangers each have a substantially tubular structure with each tube extending in a direction substantially perpendicular to the axis of the shell.

\* \* \* \* \*